United States Patent [19]
Yang

[11] Patent Number: 5,433,306
[45] Date of Patent: Jul. 18, 1995

[54] HUB ASSEMBLY FOR A BICYCLE

[76] Inventor: Shu-Chiung C. Yang, 9-1, Lane 20, Jung Hua Street, Taichung, Taiwan

[21] Appl. No.: 29,456

[22] Filed: Mar. 11, 1993

[51] Int. Cl.⁶ .................................................. F16D 41/30
[52] U.S. Cl. ........................................ 192/64; 192/46; 301/105.1
[58] Field of Search ................. 192/64, 46; 301/105.1

[56] References Cited

U.S. PATENT DOCUMENTS

| | | | |
|---|---|---|---|
| 1,429,196 | 9/1922 | Dughera | 192/64 |
| 2,181,665 | 11/1939 | Messamore | 192/64 |
| 2,211,548 | 8/1940 | Schwinn | 192/64 |
| 2,394,112 | 2/1946 | Schwinn | 192/64 |
| 2,489,934 | 11/1949 | Schwinn | 192/64 |
| 3,010,553 | 11/1961 | Van Der Plas | 192/64 |
| 3,182,529 | 5/1965 | Schwerdhofer | 192/64 X |
| 4,226,317 | 10/1980 | Nagano et al. | 192/64 |
| 4,296,850 | 10/1981 | Isobe | 192/64 |
| 4,299,318 | 11/1981 | Segawa | 192/64 |
| 4,567,973 | 2/1986 | Butz | 192/64 |
| 4,593,799 | 6/1986 | Ozaki | 192/46 |
| 4,615,423 | 10/1986 | Klauke et al. | 192/64 |
| 4,674,617 | 6/1987 | Nagano | 192/64 X |
| 4,702,486 | 10/1987 | Tsuchie | 192/64 X |
| 4,840,260 | 6/1989 | Josereau | 192/64 |

FOREIGN PATENT DOCUMENTS

| | | | |
|---|---|---|---|
| 346091 | 11/1904 | France | 192/64 |
| 717959 | 10/1931 | France | 192/64 |
| 780617 | 2/1935 | France | 192/64 |
| 997737 | 9/1951 | France | 192/64 |
| 35422 | 12/1934 | Netherlands | 192/64 |
| 461951 | 2/1937 | United Kingdom . | |
| 572237 | 9/1945 | United Kingdom | 192/64 |
| 646836 | 11/1950 | United Kingdom . | |
| 2128273 | 4/1984 | United Kingdom | 192/64 |

Primary Examiner—Leslie A. Braun
Assistant Examiner—Andrea Pitts

[57] ABSTRACT

A hub includes a hub shell having two flanges, a number of ratchet teeth formed in one of the flanges, a spindle rotatably engaged in the hub shell, a sleeve disposed on the spindle and having one or more pawls disposed on the outer peripheral portion for engagement with the ratchet teeth in order to drive the hub shell. The hub can be used in the front portion of the bicycle. The sleeve may include an extension for supporting the sprockets such that the hub can also be used in the rear portion of the bicycle.

1 Claim, 6 Drawing Sheets

HUB ASSEMBLY FOR A BICYCLE

BACKGROUND OF THE INVENTION (a) Field of the Invention

The present invention relates to a hub, and more particularly to a hub assembly for a bicycle.

(b) Description of the Prior Art

A typical hub is disclosed in U.S. Pat. No. 2,181,665 to Messamore, filed Nov. 5, 1938, the hub includes a disc fixed on the spindle for engagement with a pawl so as to rotate the wheel; the hub is particularly suitable for being used in the front portion of the bicycle and can not be used in the rear portion of the bicycle, such that the manufacturers have to make two types of hubs for both the front and rear portions of the bicycle, this is adverse for manufacturing and assembling purposes.

Another typical hub is disclosed in U.K. Patent No. 461,951 to Bayliss, Wiley and Company Limited, filed Aug. 21, 1936, the hub includes an outer driven member and an inner driving member secured together and engaged to the hub shell for driving the bicycle, however, the driven member and the driving member are suitable for being used in the rear portion of the bicycle only, the hub can not be used in the front portion of the bicycle. This is also adverse for manufacturing and assembling purposes.

Still another typical hub is disclosed in U.K. Patent No. 646,836 to Sturmey-Archer, filed Oct. 18, 1949, the hub includes a double cone for supporting two bearings, a carrier rotatably engaged on the bearings for supporting a sprocket, and a cover is required for enclosing the parts, therefore, at least three bearings, a double cone, a carrier and a cover are required to be assembled. Obviously, a large number of parts are required such that the manufacturing cost thereof is greatly increased.

The present invention has arisen to mitigate and/or obviate the afore-described disadvantages of the conventional hubs of bicycles.

SUMMARY OF THE INVENTION

The primary objective of the present invention is to provide a hub assembly for a bicycle in which the hub assembly includes a simplified configuration and is suitable for being used in both the front portion and the rear portion of the bicycle, this simplifies the assembling processes and decreases the manufacturing cost thereof.

In accordance with one aspect of the present invention, there is provided a hub assembly comprising a hub shell including a first flange and a second flange, a plurality of ratchet teeth formed in the second flange of the hub shell, a spindle rotatably engaged in the hub shell, a first cone engaged on the spindle and engaged in the first flange, a first bearing engaged between the first flange and the first cone, a sleeve fixed on the spindle and including a second cone, a second bearing engaged between the second flange and the second cone of the sleeve, and at least one pawl disposed on the sleeve for engagement with the ratchet teeth of the second flange in order to drive the hub shell. The hub assembly can be used in the front portion of the bicycle.

The sleeve includes an extension formed thereon for supporting at least one sprocket, such that the hub assembly can be used in the rear portion of the bicycle.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
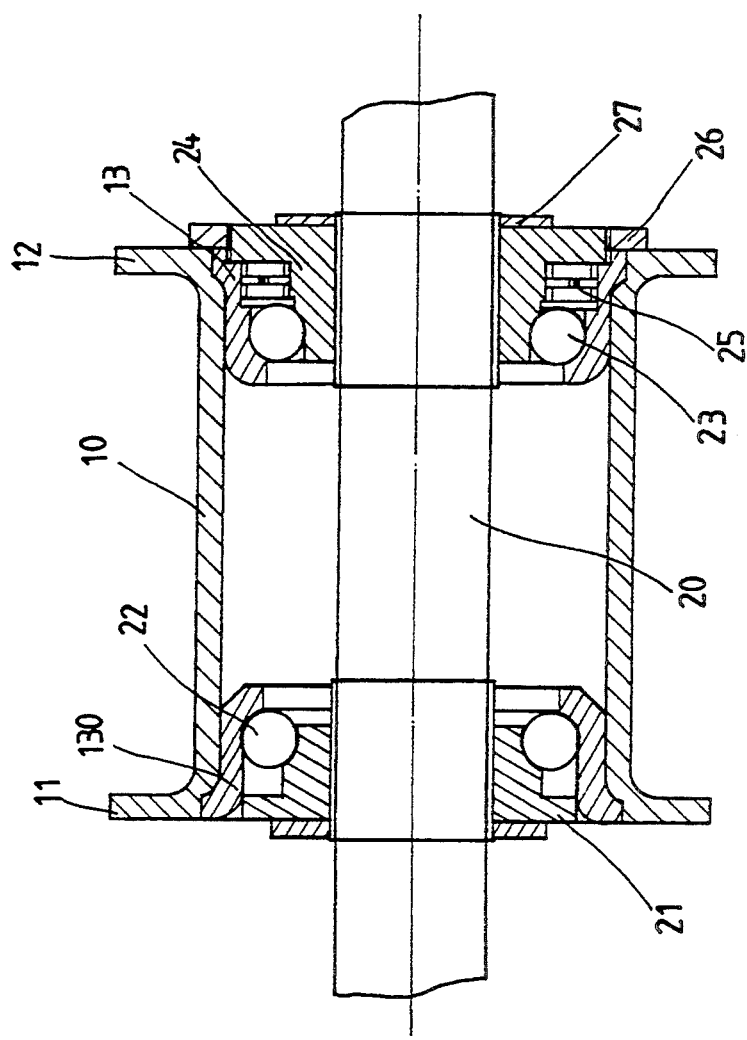
FIG. 1 is a cross sectional view of a hub assembly in accordance with the present invention.
Figure 2:
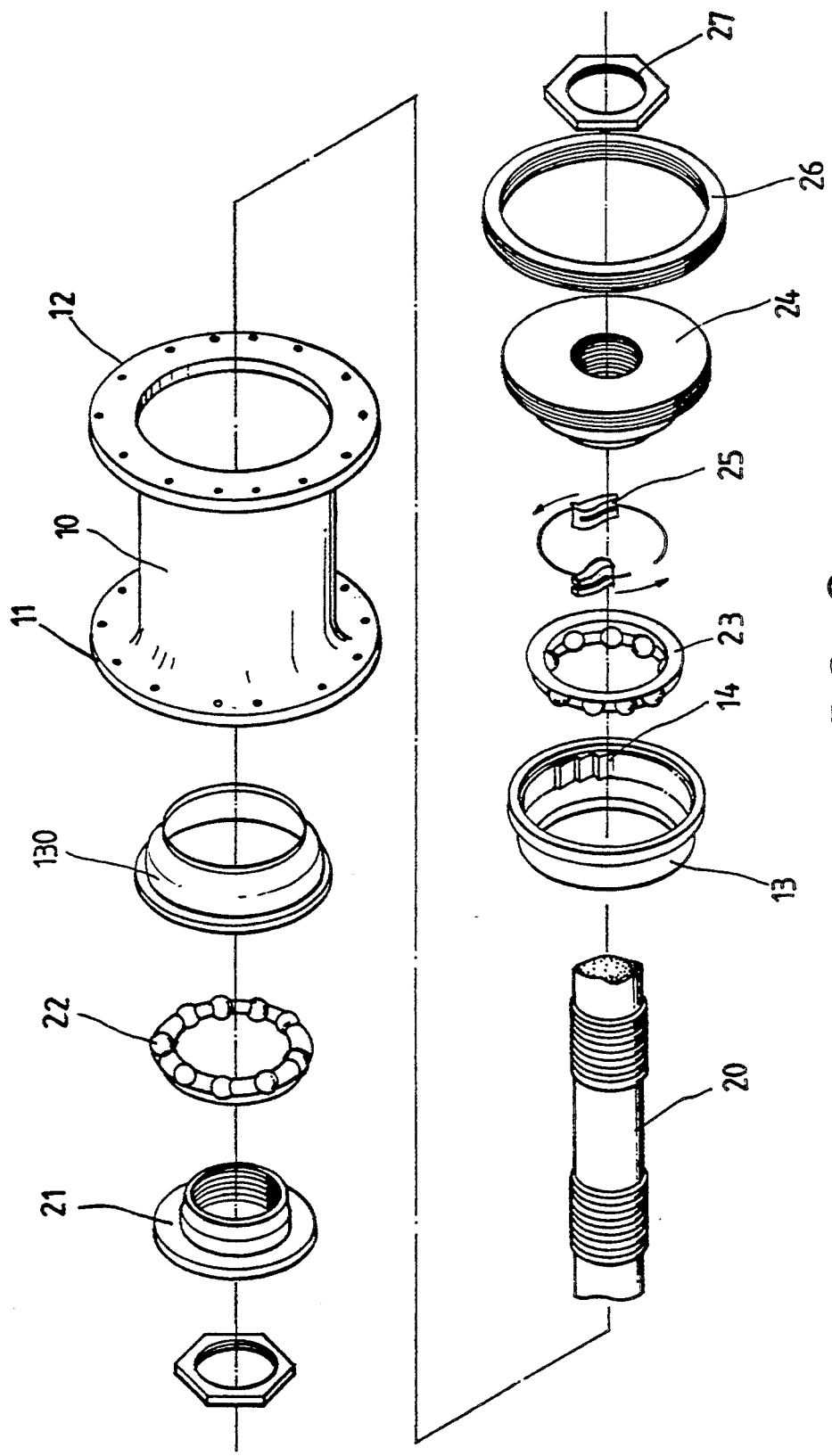
FIG. 2 is an exploded view of the hub assembly as shown in FIG. 1.

Referring to the drawings and initially to FIGS. 1 and 2, a hub assembly for a bicycle in accordance with the present invention comprises generally a hub shell 10 including two flanges 11, 12, a bowl 13, 130 force-fitted in each end of the hub shell 10, a plurality of ratchet teeth 14 formed in the bowl 13, and a spindle 20 rotatably engaged in the hub shell 10, a sleeve 21 received in the flange 11 and threadedly engaged with the spindle 20, a bearing 22 rotatably engaged between the sleeve 21 and the flange 11, a sleeve 24 and a bearing 23 received in the bowl 13, in which the sleeve 24 is threadedly engaged on the spindle 20 and includes an annular track for engagement with the bearing 23, and a pair of pawls 25 oppositely disposed on the outer peripheral portion of the sleeve 24 for engagement with the ratchet teeth 14 of the bowl 13 such that the hub shell 10 can be unidirectionally rotated by the sleeve 24 via the pawls 25 and the ratchet teeth 14, and a cap 26 threaded to the sleeve 24 and fixed in place by a nut 27. The hub assembly is suitable for being used in the front portion of the bicycle, the sleeve 24 is fixed to the spindle 20 which is coupled to the foot pedals by cranks (not shown), such that the hub assembly can be used in the front portion of the bicycle.

Figure 3:
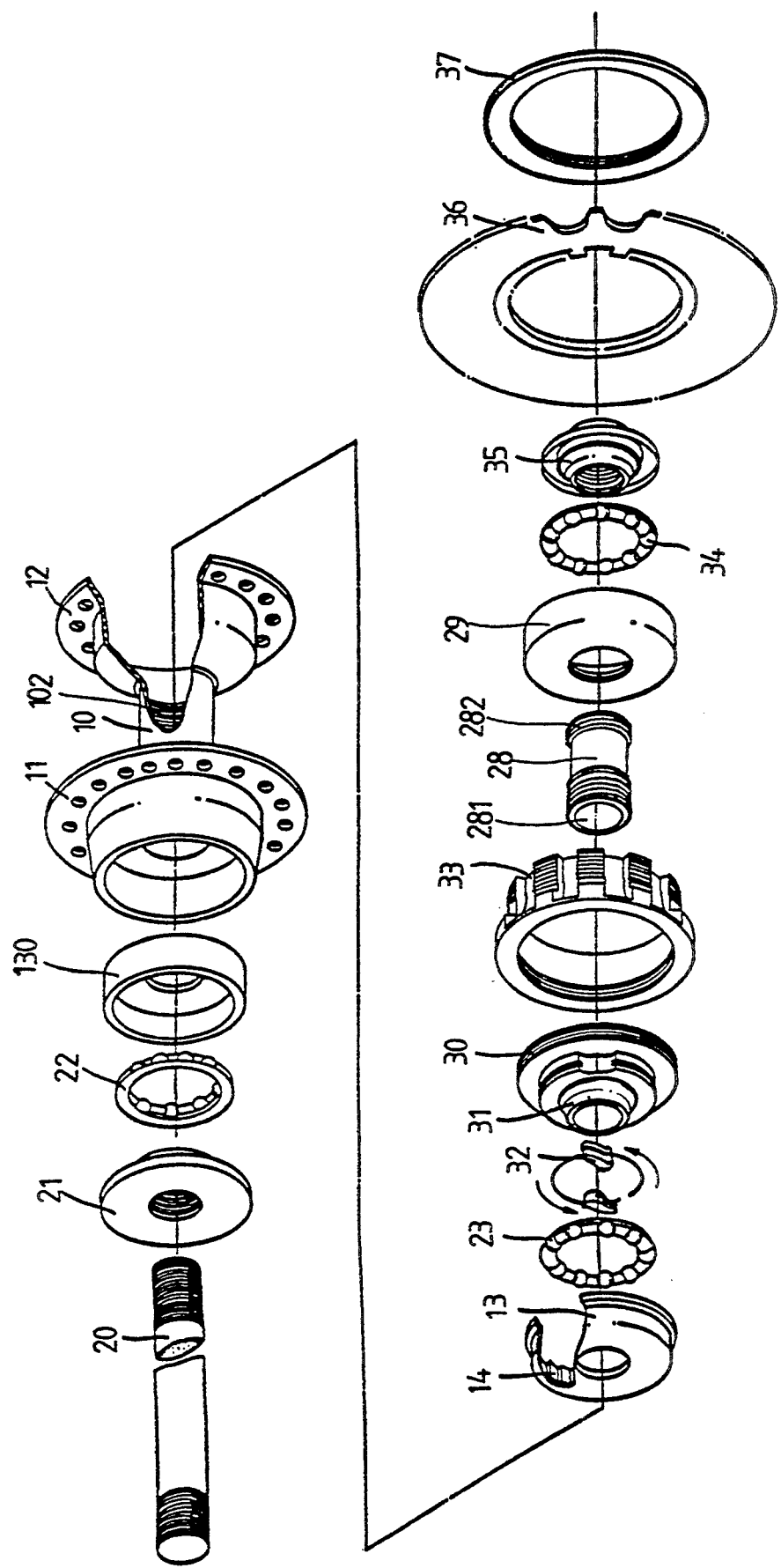
FIG. 3 is an exploded view of the hub assembly which is applicable to the rear portion of the bicycle.
Figure 4:
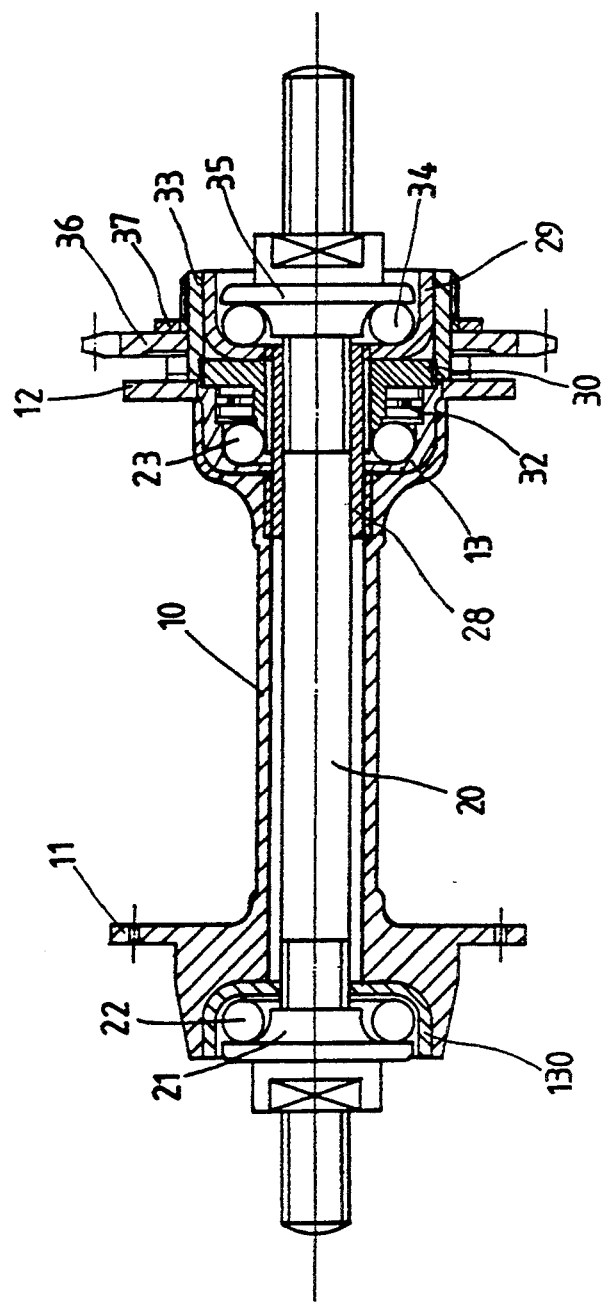
FIG. 4 is a cross sectional view of the hub assembly as shown in FIG. 3.

Referring next to FIGS. 3 and 4, the spindle 20 is also rotatably engaged in the hub shell 10, and a plurality of ratchet teeth 14 are also formed in the bowl 13 which is fixed in the flange 12 of the hub shell 10, the hub shell 10 includes an inner thread 102 formed therein, a tube 28 rotatably engaged on the spindle 20 and including an outer thread 281 threadedly engaged with the inner thread 102 of the hub shell 10 and including another outer thread 282 formed thereon distal from the outer thread 281, a cone 35 threaded on the spindle 20, a bearing 34 rotatably engaged with the cone 35, a bowl 29 rotatably engaged with the bearing 34 and threadedly engaged with the outer thread 282 of the tube 28, the sleeve 30 is rotatably engaged on the tube 28 and includes a cone 31 for engagement with the bearing 23, a pair of pawls 32 disposed on the sleeve 30 for engagement with the ratchet teeth 14 of the bowl 13, and an extension 33 threadedly engaged with the sleeve 30 and move in concert with the sleeve 30, a sprocket 36 is engaged on the extension 33 and retained in place by a clamping ring 37. This hub assembly is almost identical to that shown in FIGS. 1 and 2, except that the sleeve 30 includes an extension 33 for supporting the sprocket 36 and a tube 28, the hub assembly is suitable for being used in the rear portion of the bicycle which includes only one sprocket.

In operation, the hub shell 10 is unidirectionally driven by the sleeve 30, however, the sleeve 30 moves in concert with the extension 33 and the sprocket 36, such that the hub shell 10 can be unidirectionally driven by the sprocket 36 via the extension 33 and the sleeve 30.

Figure 5:
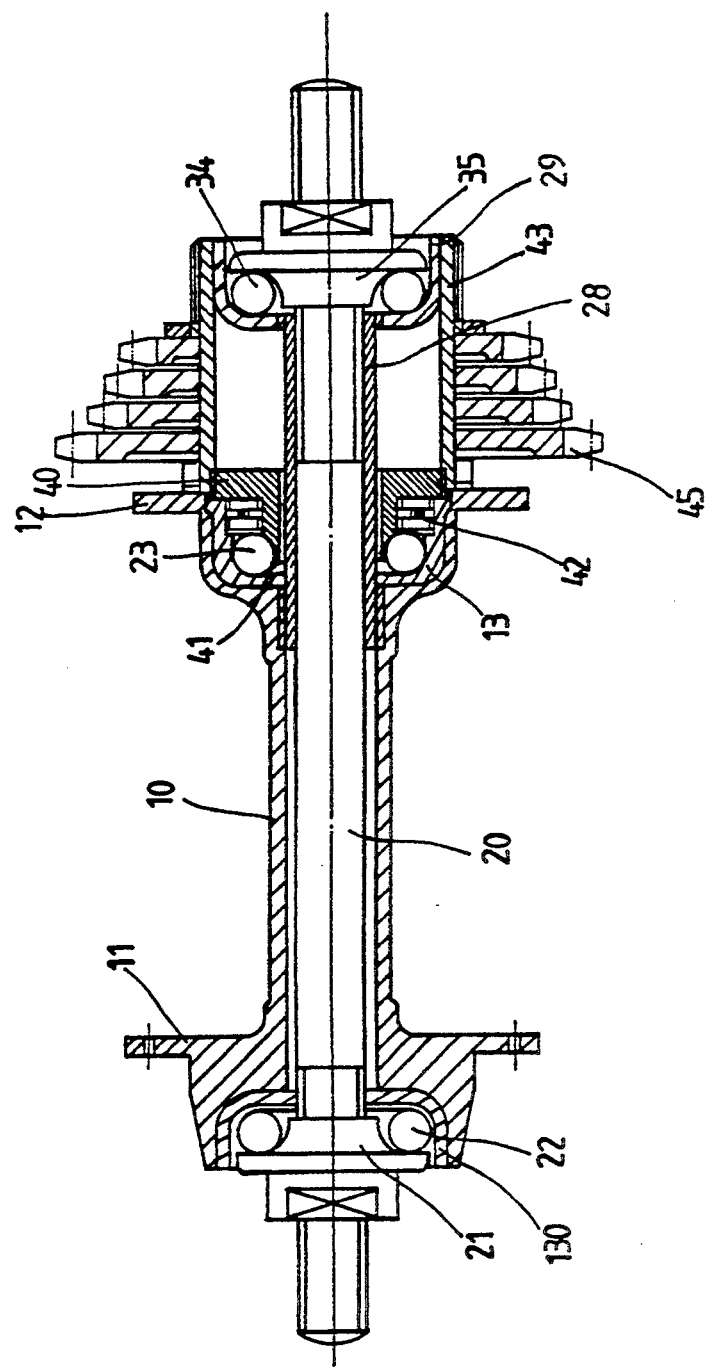
FIG. 5 is a cross sectional view similar to FIG. 3, illustrating another application of the hub assembly.
Figure 6:
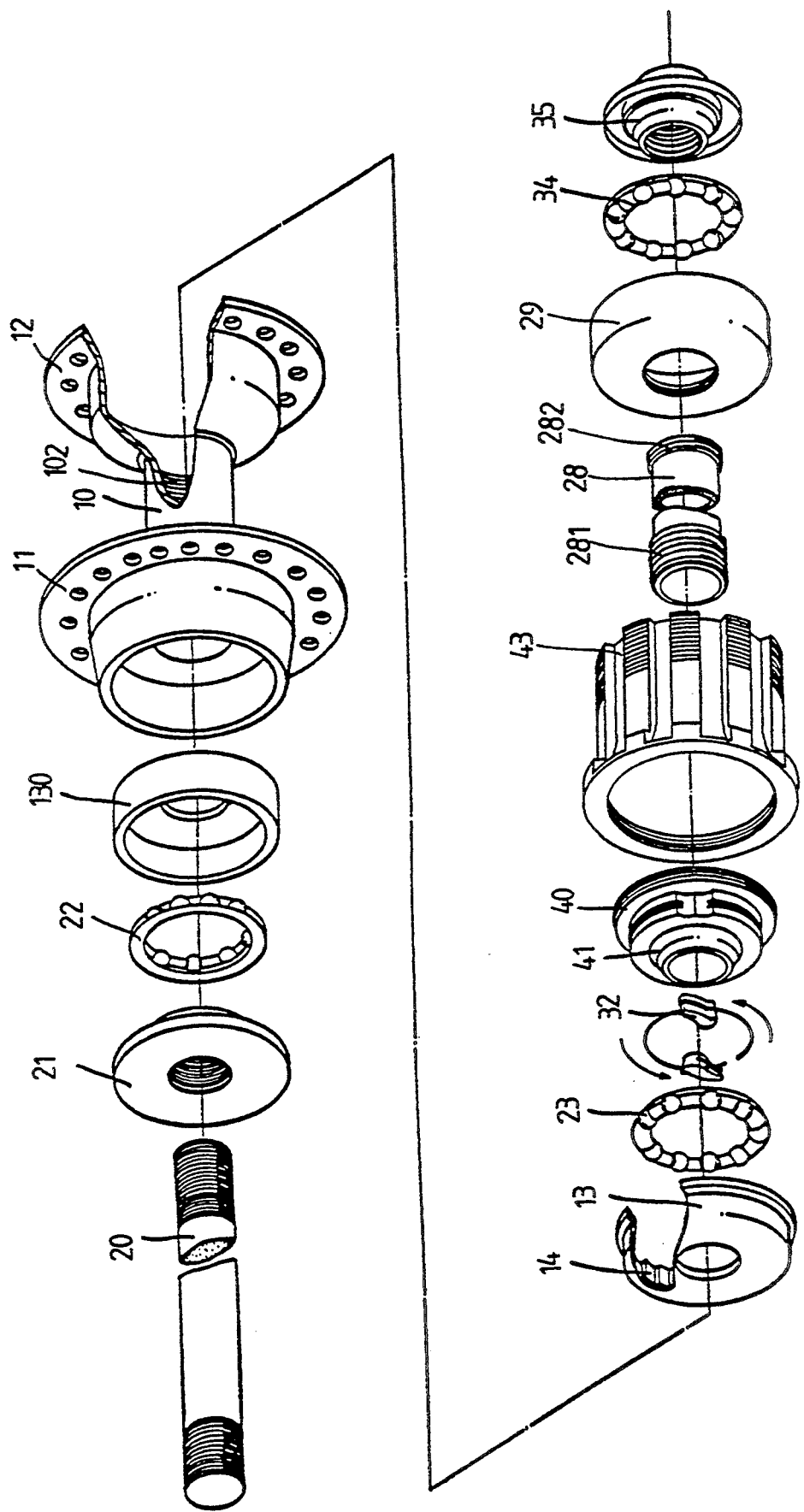
FIG. 6 an exploded view of the hub assembly as shown in FIG. 5.

Referring next to FIGS. 5 and 6, the spindle 20 is also rotatably engaged in the hub shell 10, an inner thread 102 is formed in the hub shell 10, a plurality of ratchet teeth 14 are also formed in the bowl 13 which is fixed in the flange 12 of the hub shell 10, a tube 28 rotatably engaged on the spindle 20 and including an outer thread 281 threadedly engaged with the inner thread 102 of the hub shell 10 and including another outer thread 282 formed thereon distal from the outer thread 281, a cone 35 threaded on the spindle 20, a bearing 34 rotatably engaged with the cone 35, a bowl 29 rotatably engaged with the bearing 34 and threadedly engaged with the outer thread 282 of the tube 28, a sleeve 40 is rotatably engaged on the tube 28 and includes a cone 41 for engagement with the bearing 23, a pair of pawls 32 disposed on the sleeve 40 for engagement with the ratchet teeth 14 of the bowl 13, and an extension 43 having a plurality of grooves formed therein, a number of sprockets 45 are engaged on the extension 43. This hub assembly is almost identical to that shown in FIGS. 3 and 4, except that the extension 43 and the tube 28 have a length longer than that of the extension 33 and the tube 28 of FIGS. 3 and 4, the hub assembly is also suitable for being used in the rear portion of the bicycle which includes only one or more sprockets.

Accordingly, the hub assembly in accordance with the present invention includes a plurality of ratchet teeth 14 provided in the bowl 13 which is fixed in the hub shell 10 such that the hub can be used in both the front portion and the rear portion of the bicycle. The hub shells can be made in a fast speed, the manufacturing cost thereof can thus be greatly decreased.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hub assembly comprising a hub shell including first and second flanges, a bowl fixedly engaged on an internal surface of said second flange, a plurality of ratchet teeth formed in said bowl, a spindle rotatably engaged to an internal surface of said hub shell, a first cone engaged on said spindle radially within said first flange, a first bearing engaged between said first flange and said first cone, a tube rotatably engaged on said spindle and received radially in said second flange and including first and second ends wherein said first end is threadedly engaged with said hub shell, a sleeve rotatably engaged on said tube and including a second cone formed thereon, an extension threadedly engaged to said sleeve, a second bearing engaged between said bowl and said second cone of said sleeve, at least one pawl disposed on said sleeve, a third cone disposed on said spindle and located radially within said second flange, a second bowl engaged on said spindle and threadedly engaged with said second end of said tube, a third bearing engaged between said second bowl and said third cone, and at least one sprocket disposed on said extension of said sleeve.

* * * * *